US008383328B2

(12) United States Patent
Ito

(10) Patent No.: US 8,383,328 B2
(45) Date of Patent: Feb. 26, 2013

(54) METHOD FOR PRODUCING OPTICAL PART

(75) Inventor: Toshiki Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 345 days.

(21) Appl. No.: 12/762,546

(22) Filed: Apr. 19, 2010

(65) Prior Publication Data

US 2010/0273109 A1 Oct. 28, 2010

(30) Foreign Application Priority Data

Apr. 22, 2009 (JP) ................................. 2009-104217

(51) Int. Cl.
*G02B 3/00* (2006.01)
(52) U.S. Cl. ........................................ 430/321; 430/394
(58) Field of Classification Search ......................... None
See application file for complete search history.

(56) References Cited

U.S. PATENT DOCUMENTS

| 6,236,493 | B1 * | 5/2001 | Schmidt et al. ............... 359/296 |
| 6,450,642 | B1 * | 9/2002 | Jethmalani et al. ........... 351/219 |
| 2005/0151286 | A1 | 7/2005 | Liu |
| 2005/0208431 | A1 * | 9/2005 | Devoe et al. .................. 430/321 |
| 2006/0107892 | A1 | 5/2006 | Son |
| 2008/0081264 | A1 | 4/2008 | Mennig et al. |
| 2008/0247009 | A1 | 10/2008 | Mennig |

FOREIGN PATENT DOCUMENTS

| JP | 59-220333 A1 | 12/1984 |
| JP | 2007-206704 A1 | 8/2007 |

* cited by examiner

*Primary Examiner* — John A. McPherson
(74) *Attorney, Agent, or Firm* — Canon U.S.A., Inc., IP Division

(57) ABSTRACT

A method for producing an optical part includes an irradiation process for irradiating a radiation-sensitive polymerizable composition with a radiation. The radiation-sensitive polymerizable composition includes at least a polymerizable compound (a) and a polymerizable or non-polymerizable component (c). The irradiation process includes at least a first step of irradiating with a radiation only a first irradiation region that is a portion of the radiation-sensitive polymerizable composition and a second step of irradiating with a radiation only a second irradiation region that is a portion of the radiation-sensitive polymerizable composition and is different from the first irradiation region in at least one of size and position. When the component (c) is polymerizable, the polymerization rate of the component (c) is controlled to be lower than that of the polymerizable compound (a) in the first and the second steps.

8 Claims, 3 Drawing Sheets

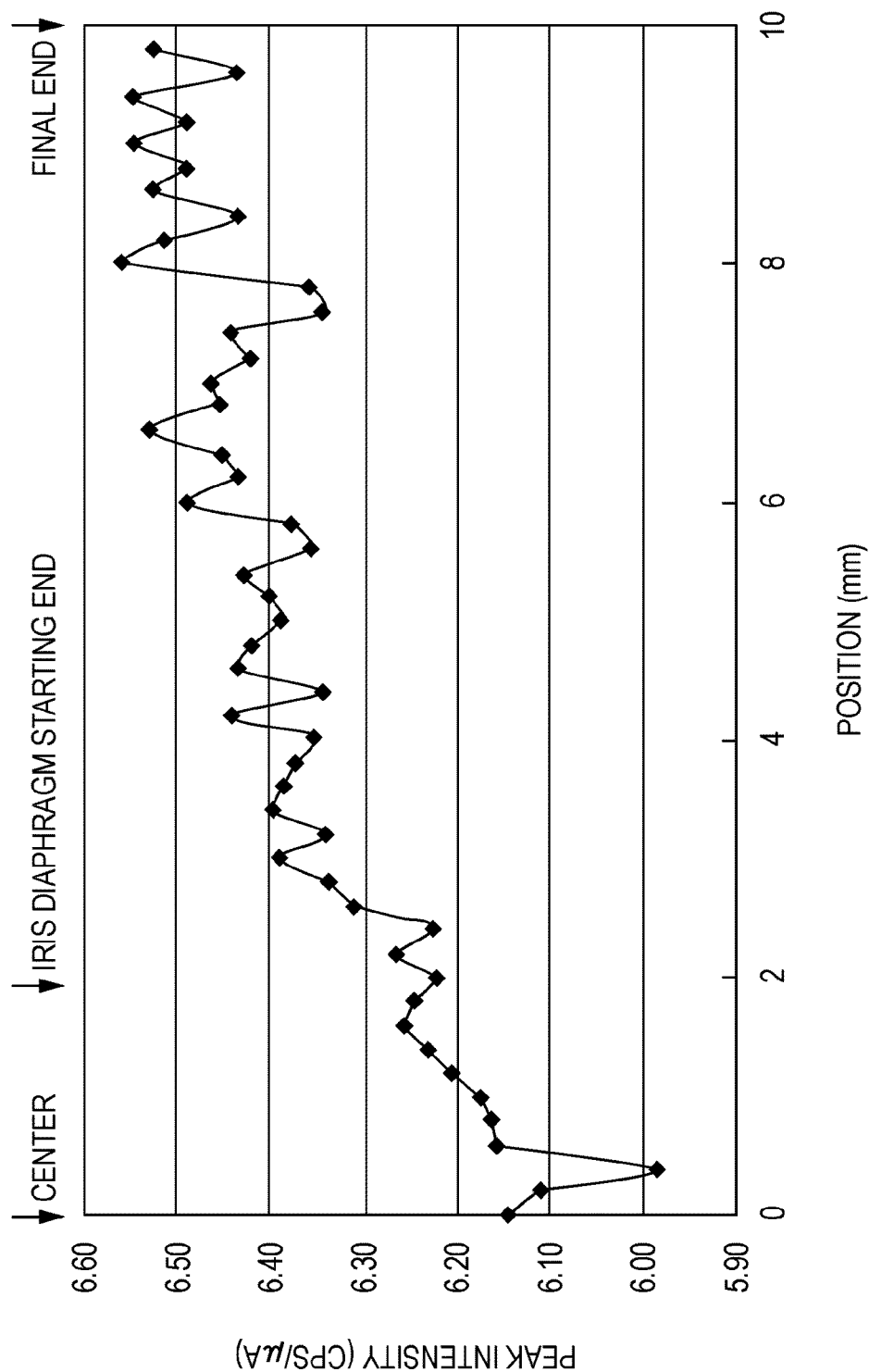

METHOD FOR PRODUCING OPTICAL PART

BACKGROUND OF THE INVENTION

1. Field of the Invention

The present invention relates to a method for producing an optical part.

2. Description of the Related Art

In various types of optical systems such as imaging systems of cameras and optical fibers and pickup optical systems of copiers and compact disks, a plurality of lenses are necessary for correcting aberrations such as a spherical aberration and a chromatic aberration. In particular, in an image pickup system and an optical system used under a white light source, the number of lenses necessary for correcting a chromatic aberration is larger than that of a monochromatic optical system.

A radial type refractive index distribution lens having a refractive index gradient (hereinafter referred to as GI: Gradient Index) in the radial direction from an optical axis in a lens medium, when it is used as an optical part, shows excellent effect on correction of, in particular, a chromatic aberration. Therefore, the number of the lenses for correcting the chromatic aberration can be decreased, and a reduction in size of a zoom lens and increases in functions, such as widening of angle and heightening of magnification, can be realized.

As methods for generating a gradient of composition ratios or a gradient of refractive indices in a plastic lens, methods employing ion exchange, electric field application, centrifugation, polymerization control, or swelling control are known. Here, in order to increase the GI, fine particles having a high refractive index are dispersed with a distribution in a plastic resin.

U.S. Patent Application Publication No. 2005/0151286 discloses a method for producing a plastic rod lens provided with a distribution of fine particles by utilizing centrifugation.

Furthermore, though it is not a technology for producing optical part but a technology for hologram recording, a method for generating a GI by utilizing radiation curing has been proposed. In Japanese Patent Laid-Open No. 2007-206704, a concentration distribution of inorganic fine particles is generated by irradiating with light an organic component of a matrix that uniformly contains inorganic fine particles and is provided with an interference pattern of bright and dark areas and transferring the fine particles based on a difference in the degree of polymerization of the matrix.

In a radial type refractive index distribution lens, the refractive index distribution in an order of mm is generated. Such a need is not limited to the refractive index distribution and is also applied to a lens having a distribution at a common composition ratio.

However, the GI lens in U.S. Patent Application Publication No. 2005/0151286 is a rod lens, and it is difficult to realize a GI or a composition ratio distribution in an order of mm, which is required in the radial type refractive index distribution lens. Furthermore, in the case of employing centrifugation, the concentration of fine particles is decreased toward the central portion. That is, since only a distribution in which the refractive index increases from the central portion toward the peripheral portion can be obtained, the degree of freedom in design is low.

In Japanese Patent Laid-Open No. 2007-206704, the transfer of fine particles based on a difference in the degree of polymerization is in an order of μm, and therefore the range of the resulting GI is about several micrometers.

SUMMARY OF THE INVENTION

The present invention provides a radically new method for producing an optical part in which composition ratio distributions including a refractive index distribution can be generated.

In the light of the above-mentioned problems, the method for producing an optical part according to the present invention is a method including an irradiation process for irradiating a radiation-sensitive polymerizable composition with a radiation, wherein the radiation-sensitive polymerizable composition includes at least a polymerizable compound (a) and a polymerizable or non-polymerizable component (c); the irradiation process includes at least a first step of irradiating with a radiation only a first irradiation region that is a portion of the radiation-sensitive polymerizable composition and a second step of irradiating with a radiation only a second irradiation region that is a portion of the radiation-sensitive polymerizable composition and is different from the first irradiation region in at least one of size and position; and when the component (c) is polymerizable, the polymerization rate of the component (c) is controlled to be lower than that of the polymerizable compound (a) in the first and the second steps.

According to the method for producing an optical part of the present invention, a composition distribution in an order of several millimeters can be generated over a broader range than ever before by changing the region irradiated with a radiation in the curing process of the composition.

Further features of the present invention will become apparent from the following description of exemplary embodiments with reference to the attached drawings.

BRIEF DESCRIPTION OF THE DRAWINGS

FIG. 3 is a graph showing a distribution of zirconium atoms in a cured composition in an example of the present invention.

DESCRIPTION OF THE EMBODIMENT

Figure 1A:
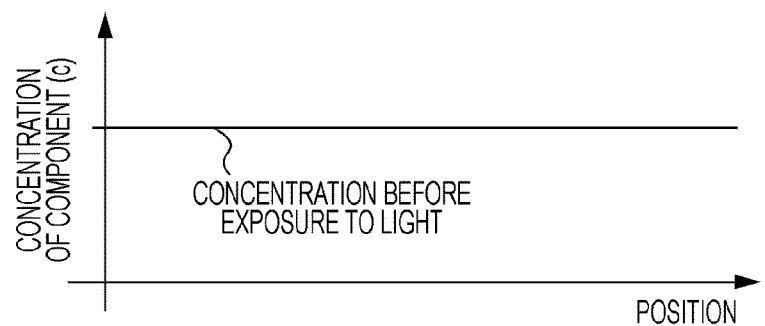
FIGS. 1A to 1D are diagrams conceptually illustrating a mechanism of generating a composition distribution in the method for producing an optical part of the present invention.

The method for producing an optical part according to an embodiment of the present invention will be described below with reference to the drawings. In principle, the same constituents are affixed with the same reference numbers, and the descriptions thereof are omitted.

The method for producing an optical part according to the embodiment includes at least the following steps:

(i) a first step of irradiating with a radiation only a first irradiation region that is a portion of a radiation-sensitive polymerizable composition; and (ii) a second step of irradiating with a radiation only a second irradiation region that is a portion of the radiation-sensitive polymerizable composition and is different from the first irradiation region in at least one of size and position.

Here, the term "radiation-sensitive polymerizable composition" means a composition containing a component that can cure by a polymerization reaction induced by irradiation with a radiation. Specifically, at least a polymerizable compound (a) and a polymerizable or non-polymerizable component (c) are used. In addition, when the component (c) is polymerizable, the polymerization rate of the component (c) is controlled to be lower than that of the polymerizable compound (a) in the first and the second steps.

The term "polymerization rate" in the present specification is defined as a consumption rate of an initial material such as a monomer and can be measured by a known method such as infrared spectroscopy or Raman spectroscopy. As long as a compound has a polymerization rate, measured by any of these known methods, lower than that of the polymerizable compound (a), the compound corresponds with the polymerizable component (c) according to the embodiment. Furthermore, when the polymerizable compound (a) and the polymerizable component (c) form a copolymer in which the ratio of the polymerizable component (c) is smaller than that of the polymerizable compound (a), it corresponds with the polymerizable component (c) in this embodiment. In many cases, the relationship in the "polymerization rate" is determined by what are used as the polymerizable compound (a) and the polymerizable component (c), but, in some cases, the relationship can be reversed by the production conditions.

Mechanism of Generating Composition Ratio Distribution

According to the method for producing an optical part according to the embodiment, an optical part having a composition ratio distribution can be produced by the below-described mechanism. The term "composition ratio distribution" means that the composition ratio is uneven, that is, the composition ratio at one position is different from that at another position, and is a concept including a case in which a gradient is present in composition ratio.

First, only a first irradiation region, which is a portion of the radiation-sensitive polymerizable composition, is irradiated with a radiation (the first step). As a result, in the first step, the polymerization reaction does not occur in the region not irradiated with the radiation in the composition (first non-irradiation region). On the other hand, in the first irradiation region, the polymerizable compound (a) is preferentially and selectively polymerized than the component (c) and forms a polymer. This is because that the component (c) is non-polymerizable or has a polymerization rate lower than that of the polymerizable compound (a) in the first step, even if the component (c) is polymerizable.

As a result, the concentration of the polymerizable compound (a) in the first irradiation region is decreased, and thereby a concentration gradient of the polymerizable compound (a) is generated between the first irradiation region and the first non-irradiation region. Consequently, the polymerizable compound (a) moves from the first non-irradiation region to the first irradiation region, and thereby the polymerization in the first irradiation region further progresses. Conversely, the component (c) having a lower polymerization rate moves from the first irradiation region to the first non-irradiation region. As a result, a composition ratio gradient is generated near the boundary of the irradiation region.

In the present specification, the term "composition ratio" means any of the composition ratio of a polymer of the polymerizable compound (a) and the non-polymerizable component (c), the composition ratio of a polymer of the polymerizable compound (a) and a polymer of the polymerizable component (c), and the copolymerization composition ratio of the polymerizable compound (a) and the polymerizable component (c).

Then, only a second irradiation region, which is a portion of the composition and is different from the first irradiation region in at least one of size and position, is irradiated with a radiation (the second step). As a result, the same phenomenon as that in the first step occurs between the second irradiation region and the second non-irradiation region.

Thus, a characteristic point of the embodiment is to change the region to be irradiated with a radiation from the first irradiation region to the second irradiation region in the process for curing the composition by irradiation with a radiation. When only the first irradiation region is irradiated without changing the irradiation region, a composition ratio gradient is generated only near the boundary thereof. However, by changing the irradiation region as in the embodiment, a desired composition ratio distribution can be generated over a broad range.

The second irradiation region can be set so as to include the first irradiation region. By thus changing the irradiation region to enlarge the area, a composition ratio gradient can be easily generated from the inner side toward the outer side (stepwise or continuously).

Furthermore, the region to be irradiated with a radiation can be continuously changed from the first irradiation region to the second irradiation region, while irradiating with a radiation. A further smooth distribution of composition ratios can be generated by continuously performing the first step and the second step. In addition, when the irradiation region is continuously changed, even if the movement of the component (c) at each point of time is in an order of $\mu$m, eventually, a distribution of the component (c) in an order of mm can be easily realized.

When the region to be irradiated with a radiation is stepwise changed from the first irradiation region to the second irradiation region, the change from the first irradiation region to the second irradiation region is in the range of 1 $\mu$m or more and 10 $\mu$m or less. By doing so, a smooth distribution of composition ratios can be generated.

The embodiment will be further described with reference to FIGS. 1A to 1D, which are diagrams conceptually illustrating a mechanism of generating a composition ratio distribution. In the embodiment, the irradiation with a radiation is performed while changing the region to be irradiated. In FIGS. 1A to 1D, the horizontal axis represents the position of the radiation-sensitive polymerizable composition, and the vertical axis represents the concentration of the component (c) in the composition. The irradiation region and the non-irradiation region are distinguished from each other by displaying a light shield corresponding to the position of the composition.

Here, the component (c) is described as a non-polymerizable component for simplification, but the similar effect can be obtained even if a polymerizable component is used. The concentration of the component (c) before the irradiation with a radiation is constant regardless of the position of the composition (FIG. 1A).

Figure 1B:
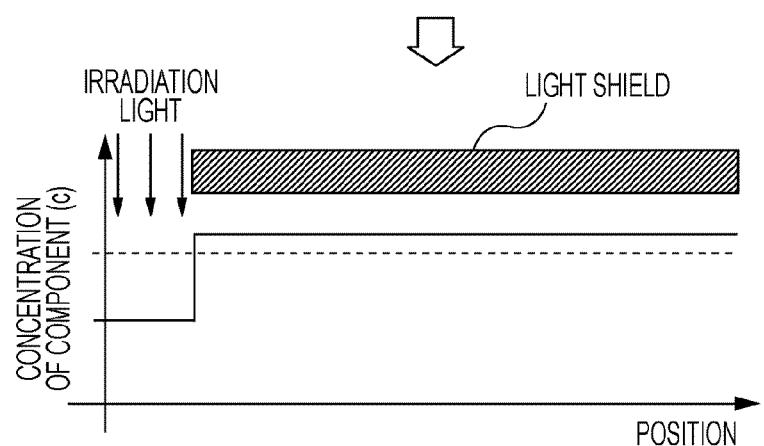

Then, the composition is irradiated with a radiation while providing an irradiation region and a non-irradiation region. Consequently, polymerization of the polymerizable compound (a) is initiated in the irradiation region to reduce the concentration of the polymerizable compound (a) in the irradiation region. With this, a concentration gradient of the polymerizable compound (a) is generated between the irradiation region and the non-irradiation region to transfer the polymerizable compound (a) from the non-irradiation region to the irradiation region, and thereby the polymerization in the irradiation region further progresses. Conversely, the non-polymerizable component (c) moves to the non-irradiation region. As a result, near the boundary of the irradiation region and the non-irradiation region, the concentration of the polymerizable compound (a) is increased on the irradiation region side, and the concentration of the component (c) is increased on the non-irradiation region side (FIG. 1B). On the non-irradiation region side where the polymerization does not progress, the component (c) evenly diffuses with the passage of time.

Figure 1C:
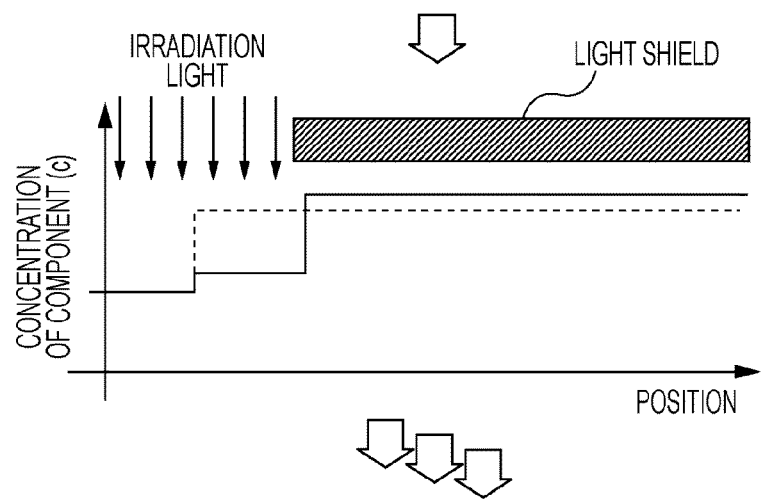

Then, a portion of the non-irradiation region in the prior step is irradiated with a radiation by transferring the shield or changing the size of the shield to extend the irradiation region to the non-irradiation region side. As a result, concentration gradients of the polymer of the polymerizable compound (a) and the component (c) are respectively generated near the new boundary as in above (FIG. 1C).

Figure 1D:
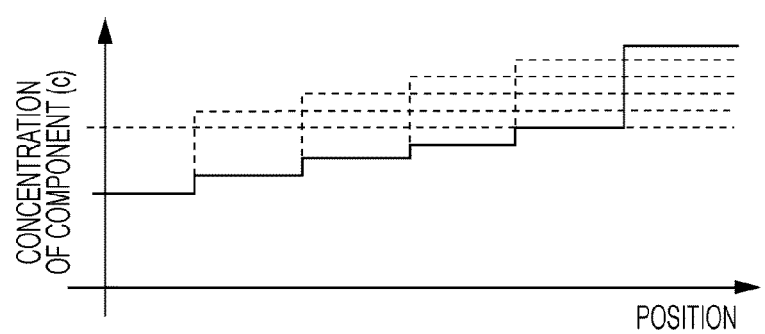

By repeating the above-described step to extend the irradiation region, the concentration of the component (c) is gradually increased from the initial position to the final position of the boundaries between the irradiation region and the non-irradiation region, and composition ratio distributions of the polymer of the polymerizable compound (a) and the component (c) are generated (FIG. 1D). Here, the concentration of the polymer of the polymerizable compound (a) is contrary to that of the component (c).

In the description above, for simplification, description for stepwise change of the irradiation region has been done, but the change may be continuously performed as described above. In addition, when the irradiation region is stepwise changed, the irradiation with a radiation may be continued from before to after the change of the irradiation region or may be stopped once and restarted after the change.

Polymerizable Compound

Examples of the polymerizable compound (a) include radical polymerizable monomers and cationic polymerizable monomers. The radical polymerizable monomer can be a compound including at least one acryloyl group or methacryloyl group as a polymerizable functional group. The cationic polymerizable monomer can be a compound including at least one vinyl ether group, epoxy group, or oxetanyl group as a polymerizable functional group.

Examples of the monofunctional (meth)acryl compound having one acryloyl group or methacryloyl group include phenoxyethyl (meth)acrylate, phenoxy-2-methyl ethyl (meth)acrylate, phenoxy ethoxyethyl (meth)acrylate, methyl (meth)acrylate, ethyl (meth)acrylate, propyl (meth)acrylate, benzyl (meth)acrylate, tetrahydrofurfuryl (meth)acrylate, diacetone (meth)acrylamide, isobutoxymethyl (meth)acrylamide, N,N-dimethyl (meth)acrylamide, and t-octyl (meth) acrylamide.

Examples of commercially available products of the monofunctional (meth)acrylic compound include Aronix M101 and M102 (these are manufactured by Toagosei Co., Ltd.), LA, IBXA, 2-MTA, HPA, and Viscoat #150 and #155 (these are manufactured by Osaka Organic Chemical Industry, Ltd.), Light Acrylate BO-A and EC-A (these are manufactured by Kyoeisha Chemical Co., Ltd.), KAYARAD TC110S (manufactured by Nippon Kayaku Co., Ltd.), NK Ester AMP-10G and AMP-20G (these are manufactured by Shin-Nakamura Chemical Co., Ltd.), FA-511A, 512A, and 513A (these are manufactured by Hitachi Chemical Co., Ltd.), PHE, CEA, and PHE-2 (these are manufactured by Daiichi Kogyo Seiyaku Co., Ltd.), VP (manufactured by BASF), and ACMO, DMAA, and DMAPAA (these are manufactured by Kohjin Co., Ltd.).

Examples of the multifunctional (meth)acryl compound having two or more acryloyl groups or methacryloyl groups include trimethylolpropane di(meth)acrylate, trimethylolpropane tri(meth)acrylate, ethylene glycol di(meth)acrylate, tetraethylene glycol di(meth)acrylate, polyethylene glycol di(meth)acrylate, and polypropylene glycol di(meth)acrylate.

Examples of commercially available products of the multifunctional (meth)acrylic compound include Yupimer UV SA1002 and SA2007 (these are manufactured by Mitsubishi Chemical Corp.), Viscoat #195 and #230 (these are manufactured by Osaka Organic Chemical Industry, Ltd.), Light Acrylate 4EG-A and 9EG-A (these are manufactured by Kyoeisha Chemical Co., Ltd.), KAYARAD PET-30 and TMPTA (manufactured by Nippon Kayaku Co., Ltd.), Aronix M208 and M210 (these are manufactured by Toagosei Co., Ltd.), and Ripoxy VR-77 and VR-60 (these are manufactured by Showa Highpolymer Co., Ltd.).

These may be used alone or in a combination of two or more. In the above, the term "(meth)acrylate" means acrylate and the corresponding methacrylate, and the term "(meth) acryloyl group" means acryloyl group and the corresponding methacryloyl group.

Examples of the compound having one vinyl ether group include methyl vinyl ether, ethyl vinyl ether, and propyl vinyl ether.

Examples of the compound having two or more vinyl ether groups include divinyl ethers such as ethylene glycol divinyl ether and diethylene glycol divinyl ether; and multifunctional vinyl ethers such as trimethylolethane trivinyl ether.

Examples of the compound having one epoxy group include phenyl glycidyl ether, p-tert-butylphenyl glycidyl ether, and butyl glycidyl ether.

Examples of the compound having two or more epoxy groups include bisphenol A diglycidyl ether, bisphenol F diglycidyl ether, brominated bisphenol A diglycidyl ether, and epoxy novolak resins.

Examples of the compound having one oxetanyl group include 3-ethyl-3-hydroxymethyl oxetane, 3-(meth)acryloxymethyl-3-ethyl oxetane, and (3-ethyl-3-oxetanylmethoxy)methyl benzene.

Examples of the compound having two or more oxetanyl groups include 3,7-bis(3-oxetanyl)-5-oxa-nonane and 3,3'-(1,3-(2-methylene)propanediylbis(oxymethylene))bis-(3-ethyloxetane).

As the polymerizable compound (a), a monofunctional monomer and a multifunctional monomer can be used together.

The content of the polymerizable compound (a) in the radiation-sensitive polymerizable composition used in the present invention may be 1% by weight or more and 99% by weight or less, for example such as 50% by weight or more and 95% by weight or less. When the content of the polymerizable compound (a) is out of the range, the width of the composition ratio to the content of the component (c) in the produced optical part becomes small, resulting in small distributions of physical properties, such as the refractive index, in the produced optical part.

Polymerization Initiator

The radiation-sensitive polymerization initiator (b) is a photo-radical generating agent when the polymerizable compound (a) is a radical polymerizable monomer, and is a photo-acid generating agent when the polymerizable compound (a) is a cationic polymerizable monomer.

The photo-radical generating agent is a compound that causes a chemical reaction by irradiation with a radiation, such as infrared light, visible light, ultraviolet light, far-ultraviolet light, X-rays, or charged-particle beams such as electron beams, to generate radicals and initiates radical polymerization.

Examples of such a compound include 2,4,5-triarylimidazole dimers which may be substituted, such as a 2-(o-chlorophenyl)-4,5-diphenylimidazole dimer; benzophenone derivatives such as benzophenone; aromatic ketone derivatives such as 2-benzyl-2-dimethylamino-1-(4-morpholinophenyl)-butanone-1,2-methyl-1-[4-(methylthio)phenyl]-2-morpholino-propanon-1-one; quinones such as 2-ethylanthraquinone; benzoin ether derivatives such as benzoin methyl ether; benzoin derivatives such as benzoin; benzyl derivatives such as benzyl dimethyl ketal; acridine derivatives such as 9-phenyl acridine; N-phenylglycine derivatives such as N-phenylglycine; acetophenone derivatives such as acetophenone; thioxanthone derivatives such as thioxanthone; xanthones; fluorenones; and benzaldehydes. These may be used alone or in a combination of two or more.

Examples of commercially available products of the photoradical generating agent include Irgacure 184 (manufactured by Chiba Japan), Lucirin TPO (manufactured by BASF), and Uvecryl P36 (manufactured by UCB).

The photo-acid generating agent is a compound that causes a chemical reaction by irradiation with a radiation, such as infrared light, visible light, ultraviolet light, far-ultraviolet light, X-rays, or charged-particle beams such as electron beams, to generate an acid and initiates cationic polymerization.

Examples of such a compound include onium salt compounds, sulfone compounds, sulfonic acid ester compounds, sulfonimide compounds, and diazomethane compounds. The onium salt compounds can generate a strong acid at a high quantum yield and therefore can be advantageously used in the present invention. In the present invention, the photo-acid generating agents can be used alone or in a mixture of two or more.

Examples of the onium salt compound include iodonium salts, sulfonium salts, phosphonium salts, diazonium salts, ammonium salts, and pyridinium salts. Specific examples of the onium salt compounds include bis(4-t-butylphenyl)iodonium perfluoro-n-butanesulfonate and bis(4-t-butylphenyl) iodonium trifluoromethanesulfonate.

Examples of the sulfone compound include β-ketosulfone, β-sulfonylsulfone, and their α-diazo compounds. Specific examples of the sulfone compounds include phenacyl phenyl sulfone, mesityl phenacyl sulfone, bis(phenylsulfonyl)methane, and 4-trisphenacyl sulfone.

Examples of the sulfonic acid ester compounds include alkylsulfonic acid esters, haloalkylsulfonic acid esters, arylsulfonic acid esters, and iminosulfonates. Specific examples of the sulfonic acid ester compound include α-methylolbenzoin perfluoro-n-butanesulfonate, α-methylolbenzoin trifluoromethanesulfonate, and α-methylolbenzoin 2-trifluoromethylbenzenesulfonate.

Specific examples of the sulfonimide compounds include N-(trifluoromethylsulfonyloxy)succinimide and N-(trifluoromethylsulfonyloxy)phthalimide.

Specific examples of the diazomethane compounds include bis(trifluoromethylsulfonyl)diazomethane and bis (cyclohexylsulfonyl)diazomethane.

The blending ratio of the polymerization initiator (b) in the radiation-sensitive polymerizable composition used in the present invention may be 0.01 to 10% by weight, for example such as 0.5 to 7% by weight, provided that the total amount of the radiation-sensitive polymerizable composition of the present invention is 100% by weight. When the blending ratio is smaller than 0.01% by weight, the curing rate may be decreased to reduce the reaction efficiency. On the other hand, when the blending ratio is larger than 10% by weight, the radiation-sensitive polymerizable composition may be deteriorated in curing characteristics, handling properties, and mechanical and optical characteristics of the cured material.

Component (c)

The component (c) is polymerizable or non-polymerizable, and when the component (c) is polymerizable, the polymerization rate thereof is lower than that of the polymerizable compound (a) in the first and the second steps.

For example, the polymerizable component (c) may be a material that uses the polymerization initiator (b) as initiating species and has a polymerization rate smaller than that of the polymerizable compound (a). When the polymerizable compound (a) is a radical polymerizable monomer, the component (c) can be fine particles or a cationic polymerizable monomer.

The component (c) can have a refractive index that is different from that of the polymer of the polymerizable compound (a). With this, a refractive index distribution is generated according to the distribution of composition ratios of the polymer of the polymerizable compound (a) formed by the production method of the present invention and the component (c).

In such a case, fine particles are advantageous as the component (c). Since the fine particles are usually non-polymerizable and generally have a refractive index sufficiently higher than that of a polymerizable monomer, a refractive index distribution having a large gradient can be generated.

The difference in the refractive index of the component (c) and the polymerizable compound (a) may be 0.01 or more and 0.3 or less, for example such as 0.02 or more and 0.1 or less.

A lower polymerization rate of the component (c) compared to that of the compound (a) is better. Specifically, a polymerization rate of the component (c) can be not higher than one half of that of the compound (a).

When the component (c) is fine particles, the material is not particularly limited as long as it is transparent to the below-described light and can be uniformly dispersed in the radiation-sensitive polymerizable composition, and an organic material, an inorganic material, or an organic-inorganic composite material can be used. The surface may be modified.

Examples of the material constituting the fine particles include titanium oxide, titanium hydroxide, zirconium oxide, tantalum oxide, aluminum oxide, niobium oxide, tin oxide, antimony oxide, zinc oxide, silicon oxide, indium tin oxide, indium oxide, lanthanum oxide, gadolinium oxide, hafnium oxide, erbium oxide, neodymium oxide, cerium oxide, dysprosium oxide, magnesium oxide, iron oxide, iron hydroxide, gallium oxide, gallium hydroxide, oxide mixtures thereof, and hydroxide mixtures thereof. Specific examples include $TiO_2$, $ZrO_2$, $Ta_2O_5$, $Al_2O_3$, $Nb_2O_5$, $SnO_2$, $Sb_2O_5$, $ZnO$, $SiO_2$, ITO (indium tin oxide), $In_2O_3$, $La_2O_3$, $Gd_2O_3$, $HfO_2$, $Er_2O_3$, $Nd_2O_3$, $CeO_2$, $Dy_2O_3$, $MgO$, $Fe_2O_3$, $Fe(OH)_3$, $Ga_2O_3$, and $Ga(OH)_3$. From the viewpoint of stability, aluminum oxide, titanium oxide, niobium oxide, tin oxide, indium oxide, zirconium oxide, tantalum oxide, lanthanum oxide, gadolinium oxide, hafnium oxide, erbium oxide, neodymium oxide, cerium oxide, dysprosium oxide, oxide mixtures thereof, and hydroxide mixtures thereof can be advantageously used.

If the fine particles have a large particle size, the irradiation light is scattered. Therefore, the particle size must be sufficiently smaller than the wavelength of the irradiation light. In addition, in an optical part that requires transparency, such as an optical lens, if the particle size is large, a problem of a decrease in transmittance is caused by the influence of light scattering. Therefore, the primary particle size of the fine particles used in the present invention may be 100 nm or less, for example such as 50 nm or less, or such as 20 nm or less. It depends on the desired optical part, but a narrow particle size distribution is advantageous. The particle size of the fine particles can be measured by a dynamic light scattering method.

In order to uniformly disperse the fine particles in the radiation-sensitive polymerizable composition, the surfaces of the fine particles may be chemically modified when the fine particles are formed, or the fine particles may be subjected to treatment such as addition of a dispersant after the fine particles are formed. The fine particles can be used alone, in a mixture, or as a composite. Furthermore, when the fine particles cause a photocatalyzed reaction as in titanium oxide, in order to prevent the resin from being decomposed by the reaction, treatment such as coating of the surfaces with, for example, a silicon compound may be performed according to need.

The content of the fine particles is determined depending on desired optical performance and mechanical characteristics and also depending on the types of the fine particles and the compound (a) used, but can be about 1 to 50% by weight. Furthermore, the fine particles dispersed are not limited to a single type, and a plurality of types of fine particles may be dispersed.

The cationic polymerizable monomers shown in the description of the compound (a) can be used as the cationic polymerizable monomer serving as the component (c) when the compound (a) is a radical polymerizable monomer.

The methacrylic group-containing monomers shown in the description of the compound (a) can be used as the methacrylic group-containing monomer serving as the component (c) when the compound (a) is an acrylic group-containing monomer.

Photosensitizer

The radiation-sensitive polymerizable composition of the present invention can contain a photosensitizer. By containing the photosensitizer, the composition distribution can be generated with a lower exposure amount. Here, the photosensitizer is a compound that is excited by absorbing light having a specific wavelength and interacts with the polymerization initiator (b), and examples thereof include coumarin derivatives, benzophenone derivatives, thioxanthone derivatives, anthracene derivatives, carbazole derivatives, and perylene derivatives. The interaction herein is, for example, energy transfer or electron transfer from the photosensitizer in an excited state. The molar absorbance coefficient of the photosensitizer to the exposure wavelength can be larger than that of the polymerization initiator (b).

Irradiation with Radiation

In the present specification, the term "radiation" collectively means various types of corpuscular rays and electromagnetic rays in a broad sense. The radiation to be irradiated is selected according to the sensitivity wavelength of the radiation-sensitive polymerizable composition used, and, for example, ultraviolet light with a wavelength about 200 to 400 nm, X-rays, or electron rays can be arbitrarily selected and used. Since a large variety of photosensitive compounds having sensitivity to ultraviolet light can be readily obtained as the polymerization initiator (b), ultraviolet light is particularly advantageous. Examples of a light source emitting ultraviolet light include high-pressure mercury lamps, ultrahigh-pressure mercury lamps, low-pressure mercury lamps, Deep-UV lamps, carbon arc lamps, chemical lamps, metal halide lamps, and xenon lamps, and ultrahigh-pressure mercury lamps can be advantageously used. Illuminance at a wavelength of 365 nm can be from 0.01 to 10000 mW/cm$^2$. When the illuminance is low, the curing takes a long time. When the illuminance is high, the polymerization rate may be high to cause fixation of the component (c) before the formation of anisotropic diffusion.

The irradiation region can be changed during the irradiation by, for example, transferring the light source or transferring the light shield. Alternatively, the manner of light irradiation may be changed as in, for example, scanning with laser light. For example, a light-shielding member may be arranged between the radiation light source and the radiation-sensitive polymerizable composition in such a manner that the range shielded from the radiation can be changed. Such a light-shielding member can be constituted by providing an aperture and means for changing the size of the aperture. The size of the aperture can be changed by using, for example, an iris diaphragm manufactured by Edmund Optics Japan Co., Ltd. The iris diaphragm can continuously change the aperture diameter in the range of from 0 to 225 mm by operating the control lever, and therefore can be used for generating a radial type composition ratio distribution that forms a GI in the radial direction from an optical axis in a lens medium. Instead of changing the size of the aperture of the light-shielding member, the irradiation region may be controlled by transferring the light-shielding member in the uniaxial direction. In such a case, a composition ratio distribution parallel to the axial direction can be generated.

The process of irradiating a radiation while changing the irradiation region may be an appropriate combination of steps, such as a step of irradiation with changing the irradiation region, a step of irradiation without changing the irradiation region, a step of transferring the light source and/or the light shield without performing irradiation, or a step of leaving the irradiation region for a predetermined time without performing the irradiation and the transfer. In addition, heating, application of an electric field, or application of a magnetic field may be performed during the irradiation. Furthermore, the irradiation may be performed with rotating the mold.

It can take about from 1 minute to 100 hours for the transfer in a range of 0.1 to 100 mm.

The entire composition can be exposed to a radiation and/or be heated, after the first and the second steps. By doing so, the whole surface of the optical part provided with a composition ratio distribution can be cured, and improvements in mechanical properties and environmental stability of the optical part can be expected. In the exposure of the whole surface, the above-described radiation can be used. The heating can be conducted using a known apparatus such as an oven or a hot plate.

When the heating is conducted for curing the whole surface, the radiation-sensitive polymerizable composition can contain a thermal polymerization initiator.

When the polymerizable compound (a) is a radical polymerizable monomer, a thermal radical polymerization initiator can be added. The thermal radical polymerization initiator may be a known one, and examples thereof include azo compounds such as azobisisobutyronitrile and azobisisovaleronitrile; organic peroxides such as diisopropyl peroxydicarbonate; persulfates such as ammonium persulfate, sodium persulfate, and potassium persulfate; and benzoyl peroxide. These compounds may be used alone or in a combination of two or more.

When the polymerizable compound (a) is a cationic polymerizable monomer, a thermal cationic polymerization initiator can be added. When a cationic polymerizable monomer is used as the component (c), the thermal cationic polymerization initiator is added for curing the whole surface by post heating. The thermal cationic polymerization initiator may be a known one, and examples thereof include 4-hydroxyphenyldimethylsulfonium, benzyl-4-hydroxyphenylmethylsulfonium, 2-methylbenzyl-4-hydroxyphenylmethylsulfonium, 2-methylbenzyl-4-acetylphenylmethylsulfonium, and 2-methylbenzyl-4-benzoyloxyphenylmethylsulfonium; and their methanesulfonates, trifluoromethanesulfonates, camphorsulfonates, and p-toluenesulfonates. These compounds may be used alone or in a combination of two or more.

The thermal polymerization initiator can be used in an amount of 0.1 to 10% by weight to the polymerizable compound (a).

The radiation-sensitive polymerizable composition constituted of the above-mentioned components can be a liquid when it is irradiated with a radiation, for elongating the diffusion distance of the component (c) in the non-irradiation region. If the composition is solid at room temperature and atmospheric pressure, it may be irradiated with a radiation while being heated according to need.

An Example of Process Flow

Figure 2A:
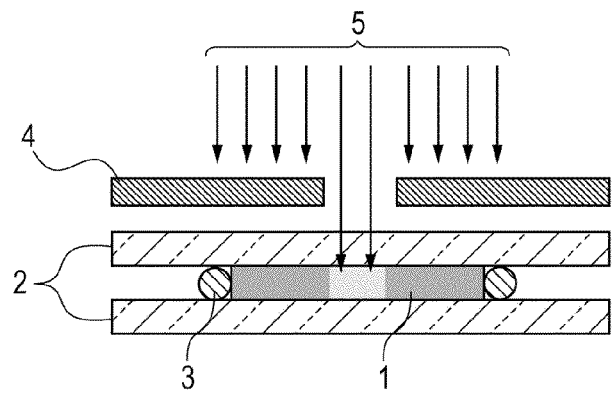
FIGS. 2A to 2D are diagrams illustrating a process flow of the method for producing an optical part of the present invention.

FIGS. 2A to 2D schematically illustrate a process flow of the method for producing an optical part having a composition ratio distribution in the present invention. The radiation-sensitive polymerizable composition 1 is enclosed in a mold of which at least one face is transparent to irradiation light (FIG. 2A). The mold can be produced by providing a space with spacers such as gaskets 3 between two substrates 2 (optical glass in FIGS. 2A to 2D) of which at least one is transparent to irradiation light. The mold is fixed with a clip having a spring, according to need, and the space is filled with the radiation-sensitive polymerizable composition. The transparent substrate may be made of a known material, and examples of the material include quartz, glass, silicone resins, fluorine resins, acrylic resins, polycarbonate resins, transparent resins such as polyimide, sapphire, and diamond.

Figure 2B:
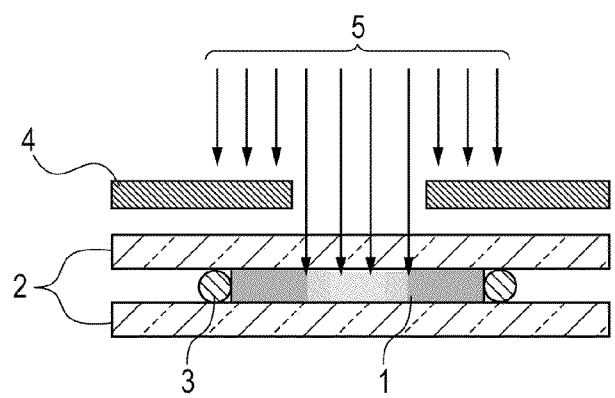
Figure 2C:
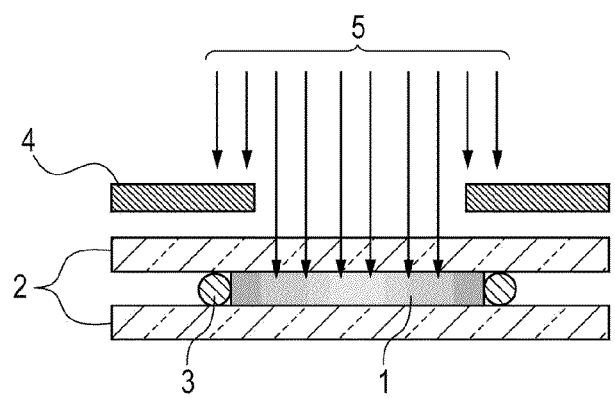
Figure 2D:
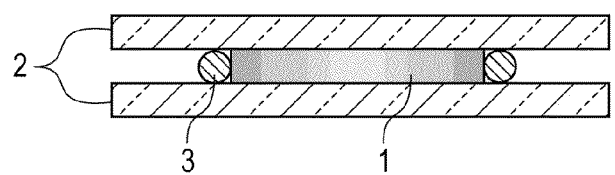

Then, irradiation with a radiation 5 is conducted while changing the irradiation region by transferring the iris diaphragm 4 (FIGS. 2B and 2C). The whole surface is uniformly irradiated or heated to complete curing of the entire optical part (FIG. 2D).

In order to easily release the cured radiation-sensitive polymerizable composition from the mold, the surface of the mold can be treated with a release agent. The treatment is performed by applying a release agent such as a fluorine resin, a silicone resin, or a fatty acid ester to the surface by, for example, spraying, dipping, or spin coating, followed by heating according to need.

EXAMPLE

The present invention will be described in detail with reference to a specific example below.

A radiation-sensitive polymerizable composition including the following components was prepared:
polymerizable compound (a): 81 parts by weight of benzyl methacrylate manufactured by Kyoseisya Chemicals and 10 parts by weight of trimethylolpropane triacrylate manufactured by Sigma-Aldrich Japan,
component (b): 0.1 parts by weight of Irgacure 184, a radical generating agent manufactured by Chiba Japan, and
component (c): 9 parts by weight of zirconium oxide having an average particle size of 10 nm manufactured by Sumitomo Osaka Cement.

The refractive indices of cured materials of the benzyl methacrylate and the trimethylolpropane triacrylate of the polymerizable compound (a) were 1.568 and 1.509, respectively, at a wavelength of 589 nm. The refractive index of the zirconium oxide of the component (c) was 2.17 at a wavelength of 589 nm.

An aerosol type release agent, Daifree GA-6010, manufactured by Daikin Industries was spray-coated on two optical glass substrates having a diameter of 70 mm and a thickness of 5 mm, and the surplus release agent was wiped off with a cleaning cloth for optical apparatus.

A fluorine rubber O-ring having a ring diameter of 35 mm and a thickness of 1.5 mm was placed between the two optical glass substrates and was fixed with clips having springs at two positions facing each other to form a mold. The radiation-sensitive polymerizable composition was injected to the mold using a disposable syringe, ensuring that no air bubbles remain.

As the radiation light source, a UV light source having a 250 W ultrahigh-pressure mercury lamp, EX250, manufactured by Hoya Candeo Optronics Corporation was used. As the movable light shield, an iris diaphragm having a minimum aperture diameter of 2 mm and a maximum aperture diameter of 50 mm manufactured by Edmund Optics Japan Ltd. was used. An ultraviolet transmitting visible absorbing filter UTVAF-50S-36U and a frosted diffuser DFSQ1-50C02-800 (both are manufactured by Sigma Koki Co., Ltd.) were disposed between the light source and the light shield. The illuminance on the optical glass surface on the irradiation side of the mold was 10 mW/cm$^2$ at a wavelength of 365 nm.

The control lever of the iris diaphragm was controlled by equipping the control lever of the iris diaphragm with an arm mounted on a high-rigidity, high-precision motorized stage, SGSP20-85(X), manufactured by Sigma Koki Co., Ltd. and driving the motorized stage with a two-axis stage controller, SHOT-602, manufactured by Sigma Koki Co., Ltd.

The irradiation was started at an initial aperture diameter of 4 mm, and the aperture diameter was extended to 20 mm over 50 minutes to continuously enlarge the irradiation region. After the irradiation process above, the iris diaphragm was fully opened for exposure of the whole surface for 15 minutes. The cured radiation-sensitive polymerizable composition was taken out from the mold.

The distribution of composition ratios in a cross section of the cured radiation-sensitive polymerizable composition was observed by mapping the peak intensities of fluorescent X-rays (15.85 keV) emitted from zirconium atoms at 0.2 mm intervals using an energy dispersive micro X-ray fluorescence spectrometer, μEDX-1300, which can perform elemental analysis of a 50 μmϕ region, manufactured by Shimadzu Corp. FIG. 3 shows the measurement results. It was confirmed that the zirconium atom concentration, that is, the concentration of zirconium oxide fine particles, had a tendency to be gradually increased over a range of 10 mm in the radial direction from the center.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-104217 filed Apr. 22, 2009, which is hereby incorporated by reference herein in its entirety.

What is claimed is:

1. A method for producing an optical part including an irradiation process for irradiating a radiation-sensitive polymerizable composition with a radiation, wherein the radiation-sensitive polymerizable composition comprises at least:
a polymerizable component (a);
a polymerization initiator (b); and
a polymerizable or non-polymerizable component (c),
the irradiation process comprises at least:
a step of enlarging an irradiation region in a concentric manner from a first irradiation region that is a portion of the radiation-sensitive polymerizable composition to a second irradiation region that is a portion of the radiation-sensitive polymerizable composition and includes the first irradiation region while irradiating the radiation-sensitive polymerizable composition with a radiation, and
when the component (c) is polymerizable, the polymerization rate of the component (c) is lower than that of the polymerizable component (a) in the step of enlarging.

2. The method for producing an optical part according to claim 1, wherein the polymerizable or non-polymerizable component (c) has a refractive index different from that of the polymerizable component (a).

3. The method for producing an optical part according to claim 1, wherein the non-polymerizable component (c) is fine particles.

4. The method for producing an optical part according to claim 1, wherein the irradiation process further comprises a step of exposing the entire composition to a radiation or heating the entire composition, after the step of the enlarging.

5. The method for producing an optical part according to claim 1, wherein the component (c) is a polymerizable component and the polymerization rate of the component (c) is one-half or less than one-half of the polymerization rate of the component (a).

6. The method for producing an optical part according to claim 1, wherein the component (c) is a polymerizable component and a radical polymerizable monomer, and the component (a) is a cationic polymerizable monomer.

7. The method for producing an optical part according to claim 1, wherein the irradiation with a radiation in the step of the enlarging is performed by changing a size of an aperture of a light-shielding member disposed between a light source, and the first and second irradiation regions.

8. The method for producing an optical part according to claim 1, wherein the optical part is a lens.

* * * * *